United States Patent [19]

Mason et al.

[11] Patent Number: 5,024,897
[45] Date of Patent: Jun. 18, 1991

[54] BLENDS OF POLYAMIDE, POLYOLEFIN, AND ETHYLENE VINYL ALCOHOL COPOLYMER

[75] Inventors: Charles D. Mason, Chatham; William Sacks, Gillette, both of N.J.; Theodore R. Engelmann; Satyajit Verma, both of Baton Rouge, La.

[73] Assignee: Allied-Signal Inc., Morris Township, Morris County, N.J.

[21] Appl. No.: 518,058

[22] Filed: May 2, 1990

Related U.S. Application Data

[62] Division of Ser. No. 309,009, Feb. 7, 1989.

[51] Int. Cl.$^5$ .................. C08L 77/00; C08L 29/02; B32B 27/34; B32B 27/28
[52] U.S. Cl. ................. 428/474.4; 428/36.92; 428/36.6; 525/57; 525/58
[58] Field of Search ............. 428/474.4, 36.92; 525/57, 58

[56] References Cited

U.S. PATENT DOCUMENTS 3,857,754 12/1974 Hirata et al. .................. 161/227
3,975,463 8/1976 Hirata et al. .................. 525/60

Primary Examiner—Carman J. Seccuro
Attorney, Agent, or Firm—Melanie L. Brown; Jay P. Friedenson

[57] ABSTRACT

Compositions comprising polyamides, polyolefins and ethylene vinyl alcohol copolymers useful as compatibilizers, related processes and articles made therefrom. A composition comprising from 50 to 99.4 percent by weight of a polyolefin, from 0.5 to 50 percent by weight of a polyamide, from 0.1 to 10 percent by weight of an ethylene vinyl alcohol copolymer comprising from 50 to 95 mole percent ethylene groups and from 5 to 50 mole percent vinyl alcohol groups and less than 5.0 mole percent and preferably less than 2.0 mole percent unhydrolyzed vinyl acetate groups.

8 Claims, 3 Drawing Sheets 90x
100 μm

320x 630x
10 μm

90x

320x

630x

BLENDS OF POLYAMIDE, POLYOLEFIN, AND ETHYLENE VINYL ALCOHOL COPOLYMER

This application is a division of application Ser. No. 309,009, filed Feb. 7, 1989.

BACKGROUND OF THE INVENTION

This invention relates to compositions comprising polyamides, polyolefins and ethylene vinyl alcohol copolymers useful as compatibilizers, and related processes and articles made therefrom.

Blends of polyamides and polyolefins are well known. Such blends have been described in the art as being homogeneous and heterogeneous. A review of the distinction between homogeneous blends and heterogeneous blends is found in U.S. Pat. No. 4,410,482 and related U.S. Pat. No. 4,444,817. These references disclose a variety of dispersant materials used to form homogeneous blends of polyolefins and polyamides. U.S. Pat. No. 4,410,482 is directed to "heterogeneous" blends of polyolefins and polyamides. Such a heterogeneous composition is useful in forming articles having improved barrier to fluid permeation and improved mechanical properties. These patents disclose that a polyolefin and a condensation polymer incompatible with the polyolefin can be formed into an improved composition by using an alkylcarboxyl-substituted polyolefin as a compatibilizing agent. A review of the compatibilizers used in these referenced patents is found beginning at column 6, line 4, of U.S. Pat. No. 4,410,482.

U.S. Pat. Nos. 3,857,754 and 3,975,463 disclose blends of compositions of polyolefin, saponified ethylene-vinyl acetate copolymer (also known as ethylene vinyl alcohol copolymer) and a carbonyl containing thermoplastic polymer.

U.S. Pat. Nos. 4,468,427 and 4,427,825 disclose a composition comprising a polyamide, preferably polyepsiloncaprolactam and from 1 to 65 percent of an ethylene vinyl alcohol copolymer composition. The composition is indicated to be a heterogeneous melt-blended composition wherein there are regions of ethylene vinyl alcohol copolymer having an average diameter of less than 500 angstroms in the polyamide.

SUMMARY OF THE INVENTION

The present invention is a composition comprising from 50 to 99.4 percent by weight of a polyolefin, from 0.5 to 50 percent by weight of a polyamide and from 0.1 to 10 percent by weight of an ethylene vinyl alcohol copolymer. The ethylene vinyl alcohol copolymer comprises from 50 to 95 mole percent ethylene groups and from 5 to 50 mole percent vinyl alcohol groups and less than 5.0 and preferably less than 2.0 mole percent unhydrolyzed vinyl acetate groups. The present invention includes a method to form the composition and articles such as bottles made from the composition.

It has been found that the specifically described ethylene vinyl alcohol copolymer is a useful "compatibilizer" to form a blend between the polyamide and the polyolefin. The composition has been found to have excellent barrier properties.

DESCRIPTION OF THE PREFERRED EMBODIMENTS

Figure 1:
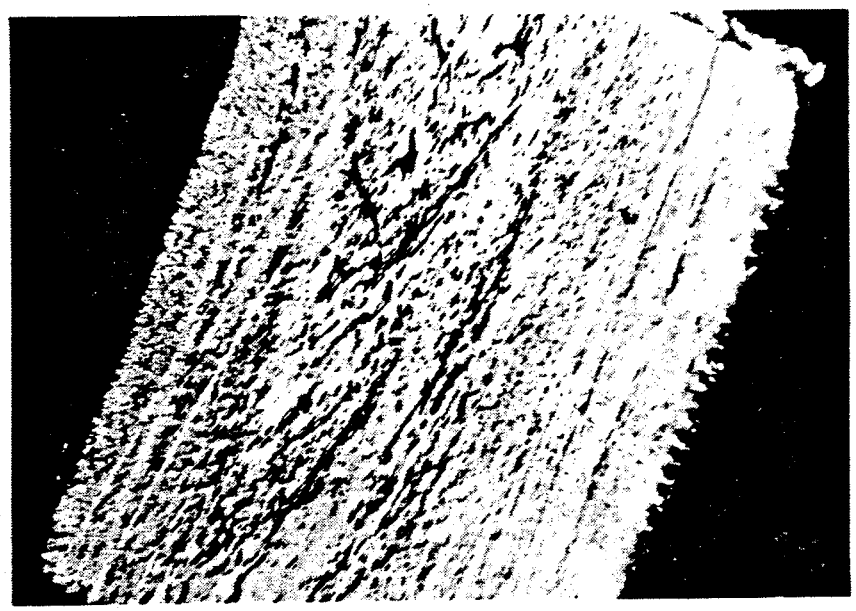
FIGS. 1, 2 and 3 are microphotographs of the section of a bottle made from the composition of Example 2 magnified 90x, 320x and 630x, respectively.

The present invention is a composition comprising from 50 to 99.4 percent by weight of a polyolefin, from 0.5 to 50 percent by weight of a polyamide, and from 0.1 to 10 percent by weight of an ethylene vinyl alcohol copolymer. The composition preferably comprises from 60 to 97 percent polyolefin, from 2 to 40 percent polyamide, and 1 to 10 percent of an ethylene vinyl alcohol copolymer. The composition more preferably comprises from 75 to 95 percent polyolefin, from 3 to 25 percent of the polyamide, and from 2 to 6 percent of the ethylene vinyl alcohol copolymer. The weight percents of these three polymers are considered relative to each other and independent of additional components of the composition. The ethylene vinyl alcohol copolymer comprises from 50 to 95, preferably from 75 to 95, and more preferably 85 to 95 mole percent ethylene groups and correspondingly from 5 to 50, preferably from 5 to 25, and more preferably 5 to 15 mole percent of vinyl alcohol groups. The ethylene vinyl alcohol should have less than 5.0 mole percent and preferably less than 2.0 mole percent and more preferably less than 1.5 mole percent of unhydrolyzed vinyl acetate groups.

Polyamides suitable for use in the present invention include the long-chain polymeric amides having reoccurring amide groups as part of the polymer backbone and preferably a number average molecular weight, as measured by membrane osmometry, of about 10,000 to 40,000. Polyamide inter-polymers comprised of a polyamide and one or more copolymers can be used. Particularly preferred are polyepsiloncaprolactam, polyhexamethylene adipamide, the copolymer of epsiloncaprolactam and hexamethylene adipamide, nylon 11 and 12. It is preferred to use polyamides having a melting temperature greater than 175° C. making them suitable for use as heat resistant films and moldings.

Nonlimiting examples of such polyamides are: (a) those prepared by the polymerization of lactams, preferably epsiloncaprolactam; (b) those prepared by the condensation of a diamine with a dibasic acid; and (c) those prepared by self-condensation of amino acids, preferably self-condensation of 11-aminoundecanoic acid.

The aforementioned polyamides can contain various terminal functionality. Preferred are the polyepsiloncaprolactams containing, (a) a carboxyl group attached to both ends of the polymer chain, (b) a carboxyl group attached to one end and an acetamide group attached to the other end of the polymer chain, (c) an amino group attached to both ends of the polymer chain, or (d) a carboxyl group attached to one end and an amino group attached to the other end of the polymer chain; and mixtures thereof.

The polyolefins include polyethylene, polypropylene, polybutylene, poly-4-methylpentene, and copolymers thereof. The polyolefins can also contain minor amounts of comonomers such as unsaturated olefins containing 3 to 12 carbon atoms with hexene being preferred.

The polyolefins can be formed in any of the commercial polymerization processes such as in a batch reactor, a continuous-flow stirred-tank reactor, a tubular reactor, or in a fluidized or stirred gas phase, or in reactors that are variations or hybrids of the above. The polyolefins are prepared in those processes utilizing as catalysts compounds of metals of Groups IVB, VB and VIB of Mendelyeev's Periodic Table, particularly titanium and chronium. For example, in polyethylene processes, titanium compounds, utilized as unsupported or supported with varius Group IIA or IIIA metal compounds or on Group IIIA, IVA or VA metal oxides or combinations of mixtures thereof, and chromium compounds of various oxidations states such as (0), (+2), or (+6) supported on Groups IIIA, IVA or VA metal oxides or mixtures thereof and not limited by modification made to these titanium and chromium systems designed to impart particular and/or specific polymer properties, can be utilized to polymerize ethylene by itself or in combination with other comonomers such as $C_3$–$C_{12}$ $\alpha$-olefins.

The preferred polyolefin is a polyethylene. The polyethylene can be low density polyethylene, linear low density (low pressure) polyethylene, or high density polyethylene. The specific gravity range is from about 0.910 to 0.97. The specific gravity of low density polyethylene is from about 0.910 to about 0.935. The specific gravity range of linear low density polyethylene is from about 0.915 to about 0.935. The preferred polyethylene is high density polyethylene having a specific gravity of 0.94 to 0.97 and preferably 0.95 to 0.96. The preferred high density polyethylene has a melt index of from 0.001 to 20.0, and preferably 0.001 to 10, more preferably 0.05 to 5.0 and most preferably from 0.05 to 1.0 grams per 10 minutes as measured on ASTM Test No. D-1238 using a load of 2160 grams at 190° C.

The ethylene vinyl alcohol copolymer used in the present invention is considered to be a separate element of the composition from the polyolefin element. Copolymers of ethylene and vinyl alcohol suitable for use in the present invention can be prepared by the methods disclosed in U.S. Pat. Nos. 3,510,464; 3,560,461; 3,847,845; and 3,585,177.

The ethylene vinyl alcohol copolymer can be hydrolyzed ethylene vinyl acetate copolymer. The ethylene vinyl acetate copolymer is preferably hydrolyzed until there is less than 5.0, preferably 2.0 and more preferably less than 1.5 mole percent vinyl acetate groups. Bottles molded from compositions containing ethylene vinyl alcohol copolymer with less than 5.0 percent unhydrolyzed vinyl acetate groups have better barrier properties. The ethylene vinyl alcohol copolymer preferably contains from 75 to 95 mole percent ethylene and more preferably 85 to 95 mole percent ethylene. Bottles produced from compositions containing copolymers of ethylene vinyl alcohol with less than 50 mole percent ethylene were difficult to mold. The ethylene vinyl alcohol copolymer preferably has a number average molecular weight of from 10,000 to 40,000 and preferably from 15,000 to 30,000. The melt index of the ethylene vinyl alcohol copolymer is preferably 5 to 200 and more preferably 5 to 20 as measured by ASTM D-1238 using a load of 2160 grams at 190° C.

Useful ethylene vinyl alcohol copolymers suitable for the present invention are commercially available from Takeda of Japan. Takeda of Japan produces ethylene vinyl alcohol copolymer under the designation Dumilan ™ which has 86 to 93 percent ethylene, and a number average molecular weight of from about 10,000 to 30,000 and a melting point of from 100° to 110° C. A suitable copolymer has about 87 percent ethylene, a number average molecular weight of about 20,000 and a melting point of 108° C.

The blend can contain other additives which do not adversely affect the physical properties or the heterogeneous nature of the composition in the formed article. Such materials include colorants such as pigments or dyes, stabilizers, inert fillers, lubricants, antioxidants, antistatic agents, and the like.

In the composition of the present invention, the ethylene vinyl alcohol copolymer acts as a compatibilizer between the polyolefin and the polyamide. By compatibilizer it is meant that the ethylene vinyl alcohol copolymer enables the polyolefin and the polyamide to be blended to form an integral structure without significant delaminations, voids, or other structural defects which may adversely affect the physical properties and barrier properties. The compatibilizer is believed to promote interpolymer or interfacial bonding between the polyolefin and the polyamide. Typically polyamides and polyolefins are considered to be incompatible polymers. It is also believed that the ethylene vinyl alcohol copolymer contributes to improved barrier properties.

The composition of the present invention is a heterogeneous melt-blended composition. This heterogeneous structural composition is present in articles made of the melt blended composition. By heterogeneous it is meant that there are regions, domains, or particles, these words being used interchangably, of polyamide in a matrix of polyolefin. It is believed that the ethylene vinyl alcohol copolymer compatibilizer functions to enable the polyamide and polyolefin composition to form an integral structure without delamination, holes, or other defects. Compatibility is evidenced by properties such as percent elongation during tensile testing and tensile impact strength.

The composition of the present invention has regions of polyamide of from 5 to about 500 micrometers, and typically from 10 to 200 micrometers in the longest dimension within the polyolefin matrix. Typically, the particles of polyamide are platelet-like in shape. They are typically from 1 to about 50 and preferably 1 to 25 micrometers thick and most preferably from 2 to 15 micrometers thick.

The composition of the present invention can be formed by melt-blending the polyolefin, the polyamide, and the ethylene vinyl alcohol copolymer together at a temperature of from 350° to 550° F. (177° to 288° C.), and preferably 400° to 500° F. (204° to 260° C.). The composition is blended for sufficient time for the regions of polyamide to be between 5 to 500, and preferably 10 to 200 micrometers in the longest direction.

Articles made from the composition of the present invention may be formed by taking the polyolefin pellets, polyamide pellets, and ethylene vinyl alochol copolymer pellets in the desired ratio and blending them physically either by hand or in a blender to obtain a uniform pellet mix and then processing this blend on an extruder or other suitable equipment at temperatures between 175° C. and 290° C. (excluding the feed zone), and preferably between 200° C. to 260° C. The temperature of the feed zone may be set about 0° to 25° C. lower depending upon the barrel length, barrel L/D, and number of zones on the barrel. The processing of the composition, prior to the formation of the article, is such that the above mentioned heterogeneous nature of dispersion is obtained based on the temperature profile, design of the extruder screw or metering device and the tooling including the die and mandrel, and the like. The molten composition is then formed into an article by a suitable forming process such as injection molding, blowing, film formation, etc.

It has been found that processing equipment such as a screw extruder with any type of specialized mixing sections such as a Maddox or Dulmage section, mixing pins, or high compression ratio combined with long metering zone etc. are detrimental to the formation of the heterogeneous structures necessary to the successful performance of the articles made from the composition of the present invention. However, the present composition, process and the article will be useful to the extent the preblends and the forming process ensure the heterogeneous dispersion of the polyamide in the polyolefin matrix.

Although the composition can be directly melt-blended as indicated above, the ethylene vinyl alcohol copolymer can be preblended with either the polyamide or the polyolefin. The preblending can be conducted in the melt and preblended pellets are blended with additional polyamide and polyolefin to preform the desired composition.

In one method the ethylene vinyl alcohol copolymer can first be mechanically mixed with polyamide pellets. The premixture can be melt-blended in a suitable melt-blending apparatus such as a screw extruder. Typically, the preblend can be formed at from 350° to 550° F. (177° to 288° C.), and preferably from 400° to 450° F. (204° to 232° C.) and then pelletized. This preblend can contain from 5 to 95 percent by weight ethylene vinyl alcohol copolymer and correspondingly 5 to 95 percent of polyamide. A preferred preblend contains 60 percent by weight ethylene vinyl alcohol copolymer and 40 percent by weight nylon.

An alternate type of preblend is made by first mixing ethylene vinyl alcohol copolymer and a polyolefin, preferably high density polyethylene. This mixture can be melt-extruded at 300° to 450° F. (149° to 232° C.) and preferably 350° to 400° F. (177° to 204° C.). The preblend can have from 5 to 95 percent by weight of ethylene vinyl alcohol copolymer. A typical preblend contains 20 percent ethylene vinyl alcohol copolymer and 80 percent polyolefin such as high density polyethylene.

A preblend can also be made containing a polyolefin, a polyamide, and ethylene vinyl alcohol copolymer. The composition of such a preblend contains from 5 to 20 percent polyolefin, 5 to 70 percent polyamide and 5 to 70 percent ethylene vinyl alcohol copolymer.

When making the above preblends, it is preferred to physically mix the different ingredients prior to melt-blending. When making the final composition it is also preferred to physically mix the components of the composition prior to melt-blending. The preblends are melt-blended using conventional melt-blending equipment, including extruders and internal mixers.

When melt-blending ethylene vinyl alcohol copolymer it is desirable to maintain the temperature of the molten ethylene vinyl alcohol copolymer at the temperature of the molten polyamide for as short a time as necessary to obtain the desired mixing and to minimize thermal degradation of the ethylene vinyl alcohol copolymer.

The compositions of the present invention also have been found useful to make films and laminates. The film can be formed by conventional means. The film can be used as a single layer or in a laminate. When used in a laminate it can be used with other layers of polyolefins, or polyamides. Additionally a variety of other laminating layers can be used including polyvinyl chloride, polyvinyl alcohol, linear saturated polyesters such as polyethylene terephthalate and polybutylene terephthalate, ionic copolymers including the salts of copolymers of ethylene and alpha, beta ethylenically unsaturated carboxylic acids including the copolymers of ethylene and the salts of acrylic acid or methacrylic acid. Adhesives can be used as needed between the layers of the laminates.

Films made of the composition of this invention can be films of thickness from 0.5 to 5 mils or can be used in laminates having layers of from 0.5 to 5 mils in thickness. The films and laminates containing layers of the composition of the present invention can be used in thicker films and sheets. The thicker films can have a thickness up to 20 mils and the sheets can be as thick as from 20 mils to 0.25 inches.

The film and sheet of the present invention can be formed by suitable means to make articles such as blisterpacks and containers.

The composition of the present invention has been found to be particularly useful to form bottles because of the excellent barrier resistance. The bottles can be used to store a large variety of liquid contents including organic liquids. Bottles can be formed using any suitable bottle-forming equipment known in the art. Typically the bottles are blow molded. Blow molding is described in Modern Plastics, 1985-1986, published by McGraw Hill at pages 178-188. A variety of blow-molding processes are reviewed including extrusion blow molding, injection-blow molding, stretch blow molding and multilayer blow molding. The composition of the present invention can be used in any of these or similar processes.

Several examples are set forth below to illustrate the nature of the invention in the manner of carrying it out. However, the invention should not be considered as being limited to the details thereof. In the following Examples, the melt index of the ethylene vinyl alcohol copolymer was measured according to ASTM D-1238 using a load of 2160 grams at 190° C.

EXAMPLES 1-3

A series of ethylene vinyl alcohol copolymer (EVOH) resins containing differing amounts of vinyl alcohol groups were used to prepare EVOH/polyamide preblends. Each of the preblends were based on a 60:40 weight ratio of EVOH to polyamide resins. The polyamide (nylon 6/66) used was a copolymer produced by copolymerization of caprolactam with hexamethylene adipamide salt. The copolymer contained 15 percent by weight of hexamethylene adipamide units. The melting point was 195° to 200° C. The melt index was 6.0 grams per 10 minutes under a load of 1000 grams when tested according to ASTM D-1238.

The pellet mix for bottle production contained 5 percent preblend pellets, 13 percent nylon 6/66 resin and 82 percent high density polyethylene (HDPE). The EVOH content of the composition was 3 percent and the polyamide content was 15 percent. The HDPE resin used had a density of 0.954 and a melt index of 0.3 dg/min and is produced as Paxon AA 55-003 by Allied Corporation.

Bottles were produced on a modified R-3S Rosade blow-molding machine with a low shear screw. The barrel and extruder head were set at 400° F. (204° C.). The screw speed was 110 rpm. The exit gap of the die was adjusted to produce cylindrical bottles of 16-ounce volume (Boston round bottles) and a weight of 32 grams.

The bottles produced were evaluated for barrier properties via weight loss of toluene and hexane solvents, the capped bottle being stored at about 23° C. and 50 percent relative humidity for 15 to 90 days prior to testing. Results are reported as the ratio of the solvent loss through a 100% HDPE bottle to the solvent loss through a bottle made of a composition of EVOH compatibilizer, HDPE, and nylon.

The results of Examples 1-3 are summarized in Table 1. The total component composition in Examples 1-3 was 82 percent HDPE, 15 percent nylon 6/66, and 3 percent EVOH. As is evident in Table 1, EVOH compatibilizers containing 8.6 to 21.5 mole percent of vinyl alcohol groups were highly effective in allowing bottles to be produced having reduced solvent permeability. Comparative 1 (Comp 1) was prepared using EVOH containing only 29 mole percent ethylene. Control 1 (Cont 1) was pure HDPE. The tensile impact property was tested according to ASTM D-1822.

TABLE 1

| Example | EVOH Composition (mole %) VOH | EVOH Composition (mole %) Ethylene | Melting Point (°C.) | Melt Index (dg/min) | Comparative Reduction in Solvent Loss vs HDPE Alone Toluene | Comparative Reduction in Solvent Loss vs HDPE Alone Hexane | Tensile Impact, ft-lb/sq in. |
|---|---|---|---|---|---|---|---|
| 1 | 8.6 | 90.9 | 102 | 170 | 5 | 5 | — |
| 2 | 9.1 | 90.3 | 102 | 72 | 6 | 11 | — |
| 3 | 21.5 | 77.4 | 106 | 46 | 33 | 22 | 53 |
| Comp 1 | 71 | 29 | 186 | 7 | (a) | (a) | 3 |
| Cont 1 | | | | | 1 | 1 | 68 |

(a) Very irregular bottles in both thickness and appearance about the circumference were produced using the composition of Comparative 1. These results show the criticality of ethylene content in the EVOH which must be maintained.

Comparative 1 which contained an EVOH resin with high levels of vinyl alcohol groups (71 mole percent) was extremely poor in uniformity.

It is also apparent in Table 1 that the bottle impermeability to solvents is improved steadily with increasing vinyl alcohol content of the compatibilizer in the range 8.6 to 21.5 percent.

Figure 2:
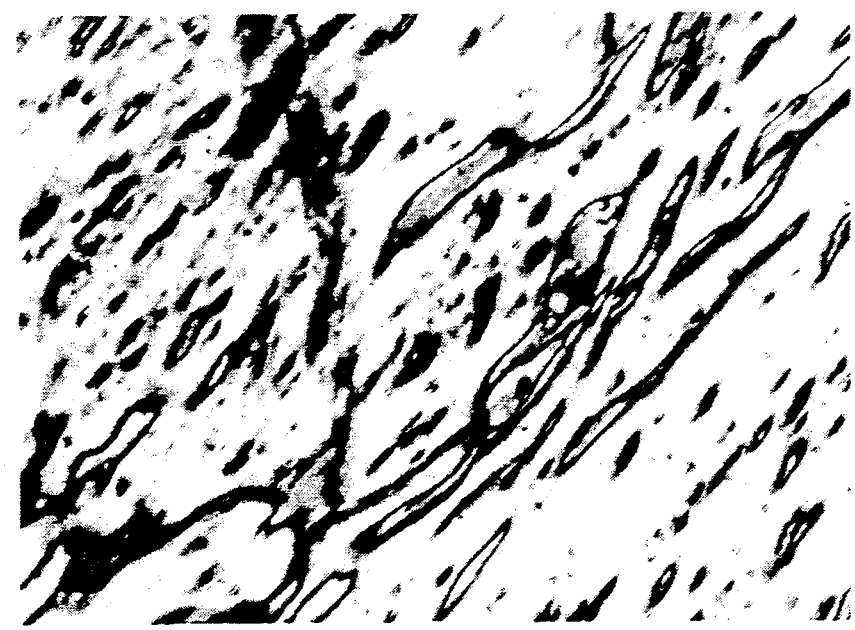
Figure 3:
Figure 4:
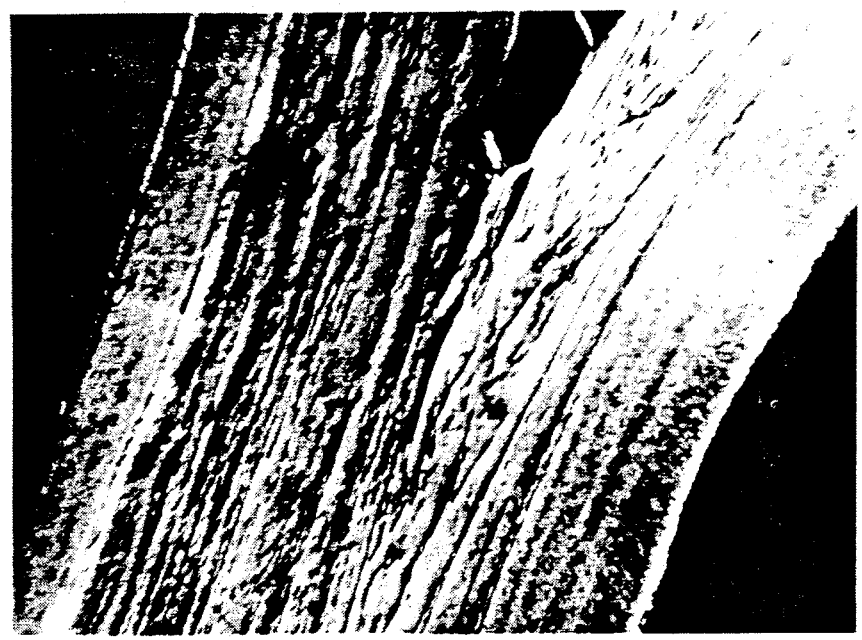
FIGS. 4, 5 and 6 are microphotographs of the section of a bottle made from the composition of Example 3 magnified 90x, 320x and 630x, respectively.
Figure 5:
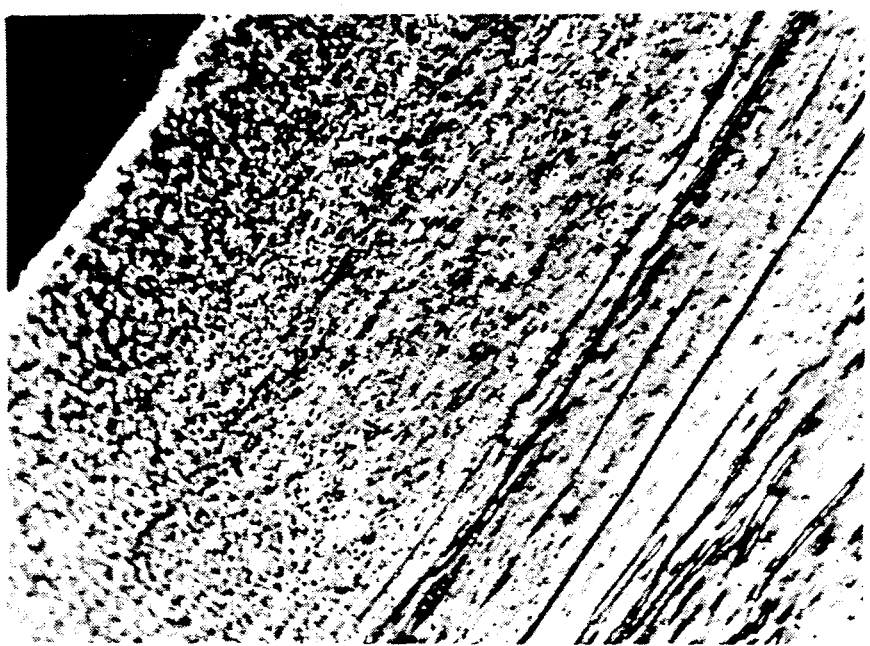
Figure 6:
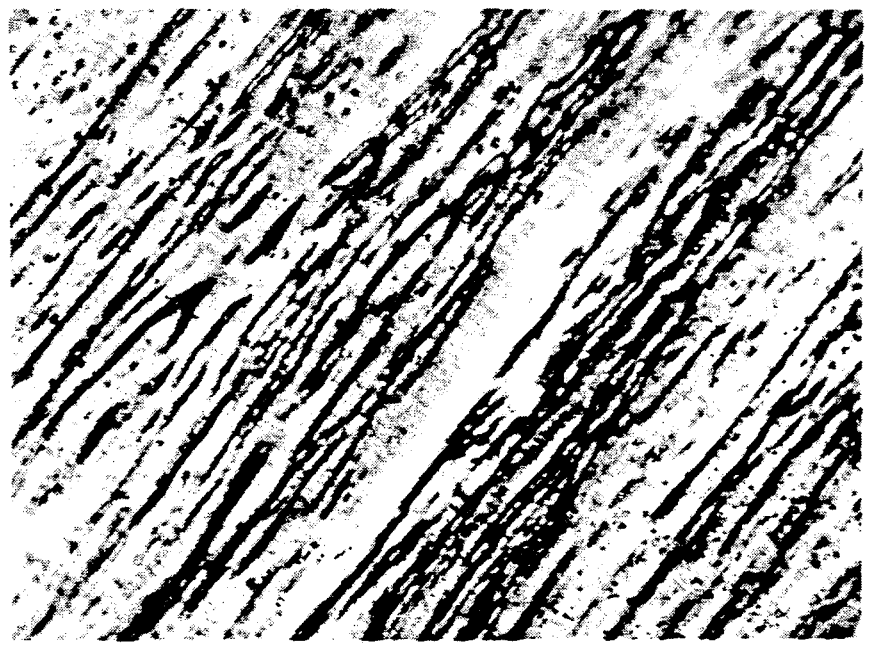

FIGS. 1-3 are microphotographs of sections of bottle walls made from the composition of Example 2, and FIGS. 4-6 are microphotographs of the bottle walls made from the compositions of Example 3. The magnification used was 90x for FIGS. 1 and 4, 320x for FIGS. 2 and 5, and 630x for FIGS. 3 and 6. Under the 320x and 630x magnification, the polyamide resin appears as "cigar-shaped" regions of about 2 to 15 micrometers thick and 10 to 200 micrometers long. These polyamide regions are embedded in the polyolefin matrix and have their long axes oriented approximately in the direction of extrusion during bottle manufacture.

EXAMPLES 4-5

Examples 4 and 5 summarized in Table 2 show that the barrier properties are not contingent on the use of nylon 6/66 only. It has been found that nylon 6 can be used in place of the 6/66 copolymer of Examples 1 and 2 together with EVOH compatibilizers containing 8.6 or 9.1 mole percent vinyl alcohol units. Also shown in Table 2 are results of Comparative 2 for a bottle containing only nylon 6 and HDPE without any EVOH compatibilizer. The nylon 6 used was Capron ® 8207F nylon sold by Allied Corporation. All of the bottles in Examples 4, 5 and Comparative 2 contained 15 percent nylon 6. The compositions of Examples 4 and 5 also contained 3 percent EVOH compatibilizer. The remaining 82 percent was HDPE resin. The bottles were produced by extrusion at about 450° F. using the same equipment as in Examples 1-3.

TABLE 2

| Example | EVOH Composition (mole %) VOH | EVOH Composition (mole %) Ethylene | Melt Index, (dg/min) | Comparative Reduction in Solvent Loss vs HDPE Alone Toluene | Comparative Reduction in Solvent Loss vs HDPE Alone Hexane | Tensile Impact, ft-lb/sq in. |
|---|---|---|---|---|---|---|
| 4 | 8.6 | 90.9 | 170 | 4 | 4 | — |
| 5 | 9.1 | 90.3 | 72 | 9 | 6 | — |
| Comp 2 | no compatibilizer | | | | (a) | 6 |

(a) Irregular appearance and thickness along about the circumference of the bottle.

The results in Table 2 demonstrate that with these EVOH compatibilizers, bottles having 4 to 9 times lower permeability to toluene and hexane could be produced with uniform thickness and appearance. In the absence of the EVOH compatibilizer, a bottle having acceptable uniformity could not be made. Examples 4 and 5 show that increasing the vinyl alcohol (VOH) content contributes to improved barrier properties.

EXAMPLES 6-7

In examples 6 and 7 the blends comprising HDPE, nylon 6/66 copolymer and EVOH copolymer compatibilizer were produced by first preblending the nylon 6/66 and the EVOH copolymer as previously described. The EVOH-nylon pre-blend was made using a ratio of 60:40 EVOH to nylon. The final composition blend contained 3 percent EVOH, 15 percent nylon 6/66 and 82 percent HDPE. The EVOH had a melt index of 10. Bottles were made using the procedure and equipment as in Examples 1-3 at a barrel temperature and parison head temperature of 400° F. (204° C.).

TABLE 3

| Example | EVOH Composition (mole %) VOH | EVOH Composition (mole %) Ethylene | Comparative Reduction in Solvent Loss vs HDPE Alone for Toluene | Tensile Impact, ft-lb/sq in. |
|---|---|---|---|---|
| 6 | 9.1 | 90.3 | 59 | — |
| 7 | 11.6 | 87.2 | 89 | — |

TABLE 3-continued

| Example | EVOH Composition (mole %) | | Comparative Reduction in Solvent Loss vs HDPE Alone for Toluene | Tensile Impact, ft-lb/sq in. |
|---|---|---|---|---|
| | VOH | Ethylene | | |
| Comp 3 | carboxylic type (zinc ionomer + ethylene ethyl acrylate copolymer) | | 20 | 53 |

For comparison in Table 3, a carboxylic compatibilizer resin of the type described in U.S. Pat. Nos. 4,410,482 and 4,444,817 was used. This resin consisted of a blend of zinc ionomer derived from ethylene methacrylic acid copolymer together with an ethylene-ethylacrylate copolymer, in the weight ratio 6:1. This carboxylic compatibilizer was used in place of EVOH at a level of 3 percent by weight in the bottle composition. Results of Comparative 3 are shown in Table 3.

Under similar conditions of bottle production, the two EVOH compatibilizers, containing 9.1 and 11.6 mole percent VOH groups, gave better results than the carboxylic compatibilizer for toluene impermeability. Additionally, the higher level of VOH used in Example 7 resulted in improved barrier properties when compared to Example 6.

EXAMPLES 8-9

In Examples 8 and 9, two EVOH compatibilizers were used. The EVOH of Example 8 had a melt index of 10 and the EVOH of Example 9 had a melt index of 20. These were very similar in vinyl alcohol content but contained differing amounts of unhydrolyzed vinyl acetate groups. An EVOH-HDPE preblend was made comprising 20:80 weight ratio of EVOH to HDPE. Pellets made from this blend were mixed with 6/66 nylon and additional amounts of HDPE pellets as follows:
EVOH-HDPE Preblend—15%
Nylon 6/66—15%
HDPE—70%
The nylon and HDPE were the types used in Examples 1–3. The final composition, therefore, contained 3 percent EVOH compatibilizer, 15 percent nylon 6/66, and 82 percent HDPE.

TABLE 4

| Example | Compatibilizer Composition (mole %) | | | Comparative Reduction in Solvent Loss vs HDPE | | Melt Index, (dg/min) |
|---|---|---|---|---|---|---|
| | VOH | VAC | Ethylene | Toluene | Hexane | |
| 8 | 11.6 | 1.2 | 87.2 | 13.6 | 8.7 | 10 |
| 9 | 11.6 | 0.8 | 87.6 | 19.7 | 10.2 | 20 |

In Examples 8 and 9, reductions in solvent permeability were obtained with both EVOH compatibilizers. These were better results for Example 9 which contained the lower level of vinyl acetate residue.

While exemplary embodiments of the invention has been described, the true scope of the invention is to be determined from the following claims:

What is claimed is:

1. A method to form a bottle from a composition comprising:
   from 50 to 99.4 percent by weight of a polyolefin;
   from 0.5 to 50 percent by weight of a polyamide; and
   from 0.1 to 10 percent by weight of an ethylene vinyl alcohol copolymer comprising from 77.4 to 95 mole percent ethylene groups and from 5 to 22.6 mole percent vinyl alcohol groups and less than 2.0 mole percent unhydrolyzed vinyl acetate groups comprising forming the composition into a bottle having discontinuous regions of said polyamide in a matrix of said polyolefin, said polyamide regions being in the form of platelets and being from 5 to 500 micrometers in their longest dimension and having a thickness of from 1 to 50 micrometers.

2. A laminate having a layer made of a composition comprising:
   from 50 to 99.4 percent by weight of a polyolefin;
   from 0.5 to 50 percent by weight of a polyamide; and
   from 0.1 to 10 percent by weight of an ethylene vinyl alcohol copolymer comprising from 77.4 to 95 mole percent ethylene groups and from 5 to 22.6 mole percent vinyl alcohol groups and less than 2.0 mole percent unhydrolyzed vinyl acetate groups, said layer having discontinuous regions of said polyamide in a matrix of said polyolefin, said polyamide regions being in the form of platelets and being from 5 to 500 micrometers in their longest dimension and having a thickness of from 1 to 50 micrometers.

3. The method of claim 1 wherein said polyamide is selected from the group consisting of polyepsiloncaprolactam, polyhexamethylene adipamide, copolymer of epsiloncaprolactam and hexamethylene adipamide, poly(undecanoamide), and poly(lauryllactam).

4. The method of claim 1 wherein said polyolefin is selected from the group consisting of polyethylene, polypropylene, polybutylene, poly-1-methylpentene, and copolymers thereof.

5. The method of claim 1 wherein said polyamide regions are from 10 to 200 micrometers in their longest dimension.

6. The laminate of claim 2 wherein said polyamide is selected from the group consisting of polyepsiloncaprolactam, polyhexamethylene adipamide, copolymer of epsiloncaprolactam and hexamethylene adipamide, poly(undecanoamide), and poly(lauryllactam).

7. The laminate of claim 2 wherein said polyolefin is selected from the group consisting of polyethylene, polypropylene, polybutylene, poly-1-methylpentene, and copolymers thereof.

8. The laminate of claim 2 wherein said polyamide regions are from 10 to 200 micrometers in their longest dimension.

* * * * *

UNITED STATES PATENT AND TRADEMARK OFFICE
CERTIFICATE OF CORRECTION

PATENT NO. : 5,024,897

DATED : June 18, 1991

INVENTOR(S) : Charles D. Mason, William Sacks, Theodore R. Engelmann and Satyajit Verma It is certified that error appears in the above-identified patent and that said Letters Patent is hereby corrected as shown below:

Please add on title page of the patent under "Related U.S. Application Data" after "Feb. 7, 1989" add --which is a continuation of Serial No. 920,546 filed October 20, 1986--

Signed and Sealed this

Sixteenth Day of March, 1993

Attest:

STEPHEN G. KUNIN

*Attesting Officer*  *Acting Commissioner of Patents and Trademarks*